United States Patent
Marappan et al.

(10) Patent No.: US 11,157,432 B1
(45) Date of Patent: Oct. 26, 2021

(54) CONFIGURATION OF BLOCK DEVICES BASED ON PROVISIONING OF LOGICAL VOLUMES IN A STORAGE SYSTEM

(71) Applicant: EMC IP Holding Company LLC, Hopkinton, MA (US)

(72) Inventors: Gopinath Marappan, Coimbatore (IN); Vinay G. Rao, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/005,692

(22) Filed: Aug. 28, 2020

(51) Int. Cl.
*G06F 13/40* (2006.01)
*G06F 13/16* (2006.01)

(52) U.S. Cl.
CPC ...... *G06F 13/4027* (2013.01); *G06F 13/1668* (2013.01)

(58) Field of Classification Search
None
See application file for complete search history.

(56) References Cited

U.S. PATENT DOCUMENTS

| | | | |
|---|---|---|---|
| 6,260,120 B1 * | 7/2001 | Blumenau | G06F 3/0622 707/999.003 |
| 6,567,397 B1 | 5/2003 | Campana et al. | |
| 6,687,746 B1 | 2/2004 | Shuster et al. | |
| 6,697,875 B1 | 2/2004 | Wilson | |
| 7,275,103 B1 | 9/2007 | Thrasher et al. | |
| 7,383,381 B1 * | 6/2008 | Faulkner | G06F 3/0607 711/114 |
| 7,454,437 B1 | 11/2008 | Lavallee et al. | |
| 7,617,292 B2 | 11/2009 | Moore et al. | |
| 7,668,981 B1 | 2/2010 | Nagineni et al. | |
| 7,770,053 B1 | 8/2010 | Bappe et al. | |

(Continued)

FOREIGN PATENT DOCUMENTS

| | | |
|---|---|---|
| CN | 103677927 B | 2/2017 |
| EP | 1117028 A2 | 7/2001 |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Michael Sun
(74) *Attorney, Agent, or Firm* — Ryan, Mason & Lewis, LLP

(57) ABSTRACT

A host device configures a first plurality of block devices each corresponding to a path between the host device and a control device of a storage system. The host device submits an inquiry to the storage system using a given block device of the first plurality of block devices. The host device receives from the storage system an indication that the given block device corresponds to a data logical volume that has been provisioned for use by the host device and issues a command to remove the first plurality of block devices based at least in part on receiving the indication. The host device performs a scan of the plurality of paths and configures, based at least in part on the scan, a second plurality of block devices each corresponding to a path of the plurality of paths between the host device and the data logical volume.

20 Claims, 6 Drawing Sheets

(56) References Cited

U.S. PATENT DOCUMENTS

| | | | |
|---|---|---|---|
| 7,809,912 B1 | 10/2010 | Raizen et al. | |
| 7,818,428 B1 | 10/2010 | Lavallee et al. | |
| 7,890,664 B1 | 2/2011 | Tao et al. | |
| 7,904,681 B1 | 3/2011 | Bappe et al. | |
| 7,925,872 B2 | 4/2011 | Lai et al. | |
| 8,166,128 B1* | 4/2012 | Faulkner | G06F 11/1471 709/214 |
| 8,250,256 B2 | 8/2012 | Ghosalkar et al. | |
| 8,285,825 B1 | 10/2012 | Nagaraj et al. | |
| 8,825,919 B1 | 9/2014 | Lim et al. | |
| 8,832,334 B2 | 9/2014 | Okita | |
| 8,874,746 B1 | 10/2014 | Gonzalez | |
| 9,026,694 B1 | 5/2015 | Davidson et al. | |
| 9,201,803 B1 | 12/2015 | Derbeko et al. | |
| 9,229,645 B2* | 1/2016 | Nakajima | G06F 3/067 |
| 9,400,611 B1 | 7/2016 | Raizen | |
| 9,430,368 B1 | 8/2016 | Derbeko et al. | |
| 9,594,780 B1 | 3/2017 | Esposito et al. | |
| 9,647,933 B1 | 5/2017 | Tawri et al. | |
| 9,672,160 B1 | 6/2017 | Derbeko et al. | |
| 9,778,852 B1 | 10/2017 | Marshak et al. | |
| 10,289,325 B1 | 5/2019 | Bono | |
| 10,353,714 B1 | 7/2019 | Gokam et al. | |
| 10,439,878 B1 | 10/2019 | Tah et al. | |
| 10,474,367 B1 | 11/2019 | Mallick et al. | |
| 10,476,960 B1 | 11/2019 | Rao et al. | |
| 10,521,369 B1 | 12/2019 | Mallick et al. | |
| 10,606,496 B1 | 3/2020 | Mallick et al. | |
| 10,637,917 B2 | 4/2020 | Mallick et al. | |
| 10,652,206 B1 | 5/2020 | Pusalkar et al. | |
| 10,754,572 B2 | 8/2020 | Kumar et al. | |
| 10,757,189 B2 | 8/2020 | Mallick et al. | |
| 10,789,006 B1* | 9/2020 | Gokam | G06F 3/067 |
| 10,936,522 B1* | 3/2021 | Iqbal | G06F 13/4027 |
| 2002/0023151 A1* | 2/2002 | Iwatani | H04L 41/06 709/223 |
| 2002/0103923 A1 | 8/2002 | Cherian et al. | |
| 2004/0010563 A1 | 1/2004 | Forte et al. | |
| 2006/0026346 A1 | 2/2006 | Kadoiri et al. | |
| 2006/0277383 A1 | 12/2006 | Hayden et al. | |
| 2007/0174849 A1 | 7/2007 | Cheung et al. | |
| 2008/0043973 A1 | 2/2008 | Lai et al. | |
| 2008/0201458 A1 | 8/2008 | Salil | |
| 2008/0301332 A1* | 12/2008 | Butler | H04L 41/0806 710/38 |
| 2009/0259749 A1* | 10/2009 | Barrett | G06F 11/3495 709/224 |
| 2010/0313063 A1 | 12/2010 | Venkataraja et al. | |
| 2011/0197027 A1 | 8/2011 | Balasubramanian et al. | |
| 2011/0296230 A1 | 12/2011 | Chen et al. | |
| 2012/0102369 A1 | 4/2012 | Hiltunen et al. | |
| 2012/0246345 A1 | 9/2012 | Contreras et al. | |
| 2013/0117766 A1 | 5/2013 | Bax et al. | |
| 2013/0339551 A1 | 12/2013 | Flanagan et al. | |
| 2014/0105068 A1 | 4/2014 | Xu | |
| 2015/0058558 A1* | 2/2015 | Fu | G06F 3/0689 711/114 |
| 2015/0222705 A1 | 8/2015 | Stephens | |
| 2015/0242134 A1 | 8/2015 | Takada et al. | |
| 2016/0092136 A1 | 3/2016 | Balakrishnan et al. | |
| 2016/0117113 A1 | 4/2016 | Li et al. | |
| 2016/0335003 A1 | 11/2016 | Ahmed et al. | |
| 2017/0235507 A1 | 8/2017 | Sinha et al. | |
| 2018/0189635 A1 | 7/2018 | Olarig et al. | |
| 2018/0253256 A1 | 9/2018 | Bharadwaj | |
| 2018/0317101 A1 | 11/2018 | Koue | |
| 2019/0095299 A1 | 3/2019 | Liu et al. | |
| 2019/0108888 A1 | 4/2019 | Sarkar et al. | |
| 2019/0334987 A1 | 10/2019 | Mallick et al. | |
| 2020/0021653 A1 | 1/2020 | Rao et al. | |
| 2020/0097203 A1 | 3/2020 | Mallick et al. | |
| 2020/0106698 A1 | 4/2020 | Rao et al. | |
| 2020/0110552 A1 | 4/2020 | Kumar et al. | |
| 2020/0112608 A1 | 4/2020 | Patel et al. | |
| 2020/0192588 A1 | 6/2020 | Kumar et al. | |
| 2020/0204475 A1 | 6/2020 | Mallick et al. | |
| 2020/0204495 A1 | 6/2020 | Mallick et al. | |
| 2020/0213274 A1 | 7/2020 | Pusalkar et al. | |
| 2020/0241890 A1* | 7/2020 | Mallick | G06F 9/44505 |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |
| WO | PCT/US2019/067144 | 5/2020 |

OTHER PUBLICATIONS

NVM Express, "NVM Express, Revision 1.3," NVM Express, May 1, 2017, 282 pages.

VMware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

U.S. Appl. No. 16/697,393 filed in the name of Vinay G. Rao et al. filed Nov. 27, 2019, and entitled "Automated Seamless Migration of Logical Storage Devices."

U.S. Appl. No. 16/710,828 filed in the name of Amit PundalikAnchi et al. filed Dec. 11, 2019, and entitled "Automated Seamless Migration with Signature Issue Resolution."

* cited by examiner

CONFIGURATION OF BLOCK DEVICES BASED ON PROVISIONING OF LOGICAL VOLUMES IN A STORAGE SYSTEM

FIELD

The field relates generally to information processing systems, and more particularly to storage in information processing systems.

BACKGROUND

Host devices typically communicate with a storage system over a network via a number of different paths. Often the host device needs to register the paths with the storage system before requesting the provisioning of logical volumes for use by the host device. A given host device may comprise a multipath input-output (MPIO) driver that is configured to process input-output (IO) operations for delivery from the host device to the storage system over the registered paths. MPIO drivers often group all of the paths between a host device and a provisioned logical volume of a storage system into a logical device, also known as a multipath device. Multipath devices are utilized by the MPIO drivers of a host device to distribute IO operations across all available paths to a given logical volume.

SUMMARY

In one embodiment, an apparatus comprises a host device comprising a processor coupled to memory. The host device is configured to communicate over a network with a storage system via a plurality of paths. The host device is configured to configure a first plurality of block devices. Each block device of the first plurality of block devices corresponds to a path of the plurality of paths between the host device and a control device of the storage system. The control device is provisioned by the storage system for use by the host device based at least in part on a zoning of the host device to the storage system. The host device is further configured to submit an inquiry to the storage system using a given block device of the first plurality of block devices and to receive from the storage system, in response to the inquiry, an indication that the given block device corresponds to a data logical volume that has been provisioned by the storage system for use by the host device. The host device is further configured to issue a command to remove the first plurality of block devices based at least in part on receiving the indication that the given block device corresponds to the data logical volume and to perform a scan of the plurality of paths. The host device is further configured to configure, based at least in part on the scan a second plurality of block devices, each block device of the second plurality of block devices corresponding to a path of the plurality of paths between the host device and the data logical volume.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
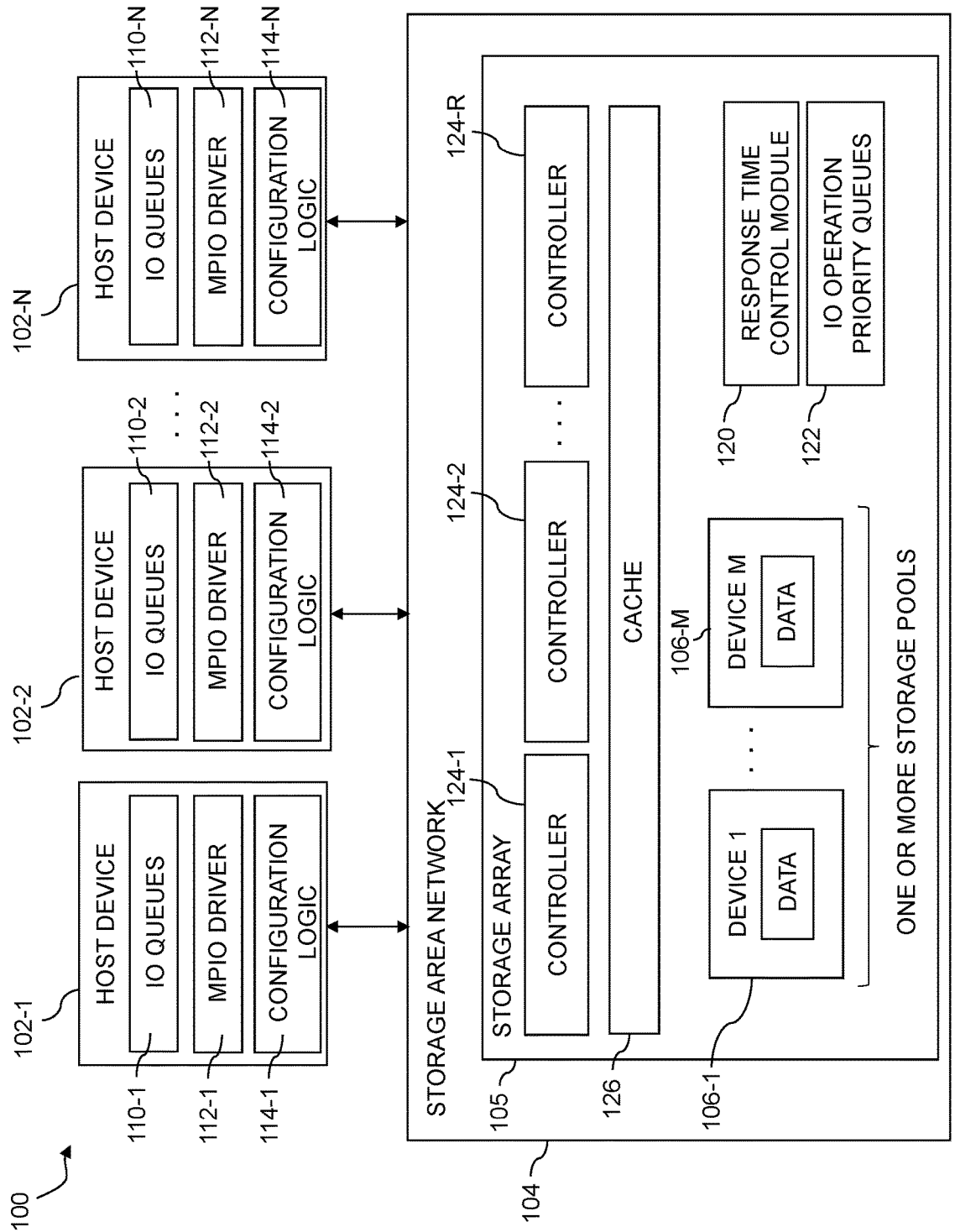
FIG. 1 is a block diagram of an information processing system configured with functionality for the configuration of block devices in an illustrative embodiment.

FIG. 1 shows an information processing system 100 configured in accordance with an illustrative embodiment. The information processing system 100 comprises a plurality of host devices 102-1, 102-2, ... 102-N. The host devices 102 communicate over a storage area network (SAN) 104 with at least one storage array 105. The storage array 105 comprises a plurality of storage devices 106-1, ... 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102 and is therefore also referred to herein as a "shared storage system."

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a Platform-as-a-Service (PaaS) model, although it is to be appreciated that numerous other cloud infrastructure arrangements could be used.

The storage devices 106 of the storage array 105 of SAN 104 implement logical volumes such as, e.g., logical units (LUNs), that are configured to store objects for users associated with the host devices 102. These objects can comprise files, blocks or other types of objects. In illustrative embodiments, the storage devices 106 may comprise one or more clusters of storage devices 106. The host devices 102 interact with the storage array 105 utilizing read and write commands as well as other types of commands that are transmitted over the SAN 104. Such commands in some embodiments more particularly comprise Small Computer System Interface (SCSI) commands or non-volatile memory express (NVMe) commands, although other types of commands can be used in other embodiments. A given IO operation, as that term is broadly used herein, illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple IO paths to the storage array 105, with at least one of the storage devices 106 of the storage array 105 being visible to that host device on a given one of the paths. A given one of the storage devices 106 may be accessible to the given host device over multiple IO paths. In illustrative embodiments, with reference also to the example of FIG. 2, each of the host devices 102 comprises one or more hardware bus adapter (HBA) ports 200, e.g., HBA ports 200-1 and 200-2 in the example of FIG. 2, which are utilized to communicate with the storage array 105 via the SAN 104. In some embodiments, the HBA ports 200 are referred to as initiators for the IO paths. For example, the HBA port 200-1 of host device 102-1 may be referred to as initiator 1 (I1) and the HBA port 200-2 of host device 102-1 may be referred to as initiator 2 (I2). HBA ports 200 may comprise any circuitry that is configured to enable communication between the host devices 102 and the storage array 105 or any other devices.

Different ones of the storage devices 106 of the storage array 105 illustratively exhibit different latencies in processing of IO operations. In some cases, the same storage device may exhibit different latencies for different ones of multiple IO paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The storage array 105 in the present embodiment further comprises additional components such as response time control module 120 and IO operation priority queues 122, illustratively configured to make use of the above-described persistent memory. For example, the response time control module 120 may be used to implement storage array-based adjustments in response time for particular IO operations based at least in part on service level objective (SLO) information stored by the storage array 105 in its persistent memory. The response time control module 120 operates in conjunction with the IO operation priority queues 122.

The storage array 105 utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105.

Process tags may be used in assigning different ones of the IO operations to different ones of the IO operation priority queues 122, as disclosed in U.S. patent application Ser. No. 15/849,828, filed Dec. 21, 2017, and entitled "Storage System with Input-Output Performance Control Utilizing Application Process Detection," which issued as U.S. Pat. No. 10,474,367 on Nov. 12, 2019, the entirety of which is incorporated by reference herein.

Storage array 105 also comprises a plurality of controllers 124-1, 124-2, . . . 124-R and a cache 126. In some embodiments, storage array 105 may comprise one controller 124, two controllers 124 or any other number of controllers 124. In illustrative embodiments, controllers 124 comprise processing devices, memory, or other circuitry that may be used to service input-output operations that are received from the host devices 102. While controllers 124 may be described as comprising particular configurations herein, controllers 124 are not limited to the disclosed embodiments and may comprise any other configuration of electrical and software components that may be utilized to service input-output operations that are received from host devices 102 by storage array 105. With reference also to the example of FIG. 2, in some embodiments, each of the controllers 124 comprises one or more ports 202, which are utilized to communicate with the host devices 102 via the SAN 104.

Figure 2:
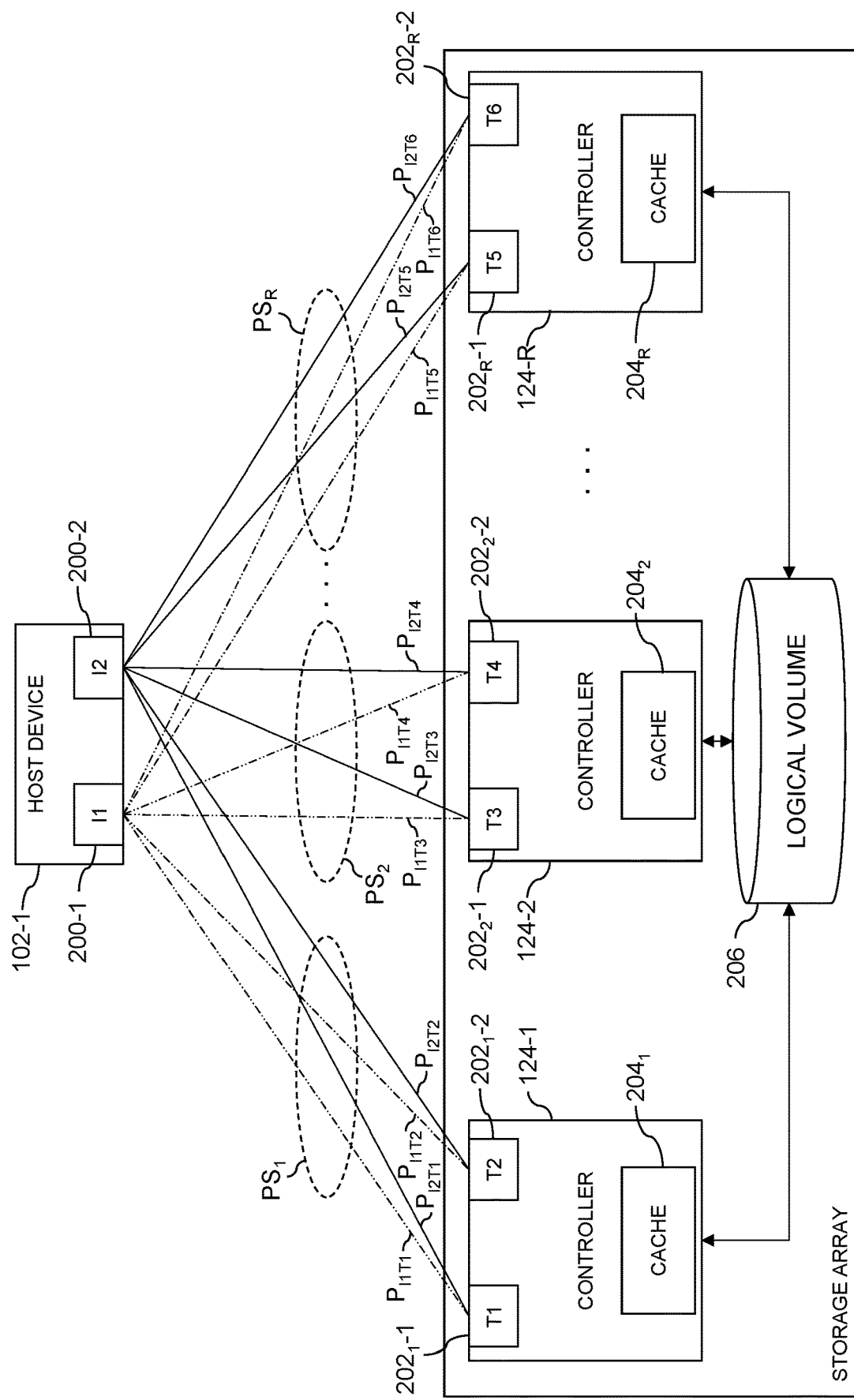
FIG. 2 is a block diagram illustrating paths between a host device and controllers of the information processing system of FIG. 1 in an illustrative embodiment.

In the example shown in FIG. 2, controller 124-1 comprises ports $202_1$-1 and $202_1$-2, controller 124-2 comprises ports $202_2$-1 and $202_2$-2, . . . and controller 124-R comprises ports $202_R$-1 and $202_R$-2. In some embodiments, the ports 202 are referred to as targets for the IO paths. For example, in the illustrated example, the ports $202_1$-1 and $202_1$-2 of controller 124-1 may be referred to as targets 1 (T1) and 2 (T2) respectively, the ports $202_2$-1 and $202_2$-2 of controller 124-2 may be referred to as targets 3 (T3) and 4 (T4) respectively, and the ports $202_R$-1 and $202_R$-2 of controller 124-R may be referred to as targets 5 (T5) and 6 (T6) respectively.

The cache $204_1$, $204_2$, $204_3$ of each of the controllers 124 comprise one or more memory devices such as, e.g., random access memory (RAM), read-only memory (ROM), flash memory or other types of memory, in any combination.

In some embodiments, cache 126 is a global cache that is separate from and accessible by all of the controllers 124. Cache 126 may comprise one or more memory devices such as, e.g., RAM, ROM, flash memory or other types of memory, in any combination. In some embodiments, the caches 204 of one or more of the controllers 124 may together comprise some or all of cache 126.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as VNX®, VMAX®, Unity™ or PowerMax™ storage arrays, commercially available from Dell EMC.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible.

Accordingly, the storage array 105 can also be implemented in a distributed manner across multiple data centers.

The host devices 102 comprise respective sets of IO queues 110-1, 110-2, . . . 110-N, respective MPIO drivers 112-1, 112-2, . . . 112-N and respective configuration logic 114-1, 114-2, . . . 114-N. The MPIO drivers 112 collectively comprise a multipath layer of the host devices 102. The configuration logic 114 may be implemented as part of the MPIO drivers 112 of the respective host devices 102 or separate from the MPIO drivers 112.

MPIO drivers typically group all paths from a host device to a logical volume, such as a LUN, into a single logical device known as a multipath device. The individual block devices representing each path are known as native devices. Applications use a multipath device for IO operations so that the IO operations may be distributed across all available paths. When paths fail or timeout, the MPIO driver will typically redirect the IO operations to other alive paths in the multipath device.

The MPIO drivers described herein may comprise, for example, otherwise conventional MPIO drivers, such as PowerPath® drivers from Dell EMC, suitably modified in the manner disclosed herein to provide functionality for the configuration of block devices. Other types of MPIO drivers from other driver vendors may be suitably modified to incorporate functionality for the configuration of block devices as disclosed herein.

Paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from the respective addition or deletion of at least a portion of the storage devices 106 of the storage array 105.

Addition or deletion of paths can also occur as a result of zoning and masking changes or other types of storage system reconfigurations performed by a storage administrator or other user.

In some embodiments, paths are added or deleted in conjunction with the addition of a new storage array or the deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be performed by the MPIO drivers of the multipath layer as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

For each of one or more new paths identified in a path discovery scan of the type described above, the corresponding one of the host devices 102 is configured to execute a host registration operation for that path. The host registration operation for a given new path illustratively provides notification to the storage array 105 that the corresponding one of the host devices 102 has discovered the new path.

With reference again to the example of FIG. 2, host device 102-1 comprises a multipath device that includes a plurality of paths P between the host device 102-1 and a logical volume 206 of the storage array 105. Each path P comprises an initiator and a target. For example, a path $P_{I1T1}$ from host device 102-1 to the logical volume 206 comprises initiator I1 (i.e., HBA port 200-1 of host device 102-1) and target T1 (i.e. port $202_1$-1 of controller 124-1). Paths $P_{I2T1}$, $P_{I1T2}$, $P_{I2T2}$, $P_{I1T3}$, $P_{I2T3}$, $P_{I1T4}$, $P_{I2T4}$, $P_{I1T5}$, $P_{I2T5}$, $P_{I1T6}$ and $P_{I2T6}$ similarly comprise respective initiators and targets as illustrated. The paths P of the multipath device that utilize the same controller 124-1 may also be grouped together as path sets PS. As illustrated in FIG. 2, for example, paths $P_{I1T1}$, $P_{I2T1}$, $P_{I1T2}$ and $P_{I2T2}$ utilize controller 124-1 and are grouped together into a path set $PS_1$; paths $P_{I1T3}$, $P_{I2T3}$, $P_{I1T4}$ and $P_{I2T4}$ utilize controller 124-2 and are grouped together into a path set $PS_2$; and paths $P_{I1T5}$, $P_{I2T5}$, $P_{I1T6}$ and $P_{I2T6}$ utilize controller 124-R and are grouped together into a path set $PS_R$.

The MPIO drivers utilize the multiple paths described above to send IO operations from the host devices 102 to the storage array 105.

For example, an MPIO driver 112-1 is configured to select IO operations from its corresponding set of IO queues 110-1 for delivery to the storage array 105 over the SAN 104. The sources of the IO operations stored in the set of IO queues 110-1 illustratively include respective processes of one or more applications executing on the host device 102-1. Other types of sources of IO operations may be present in a given implementation of system 100.

Figure 3:
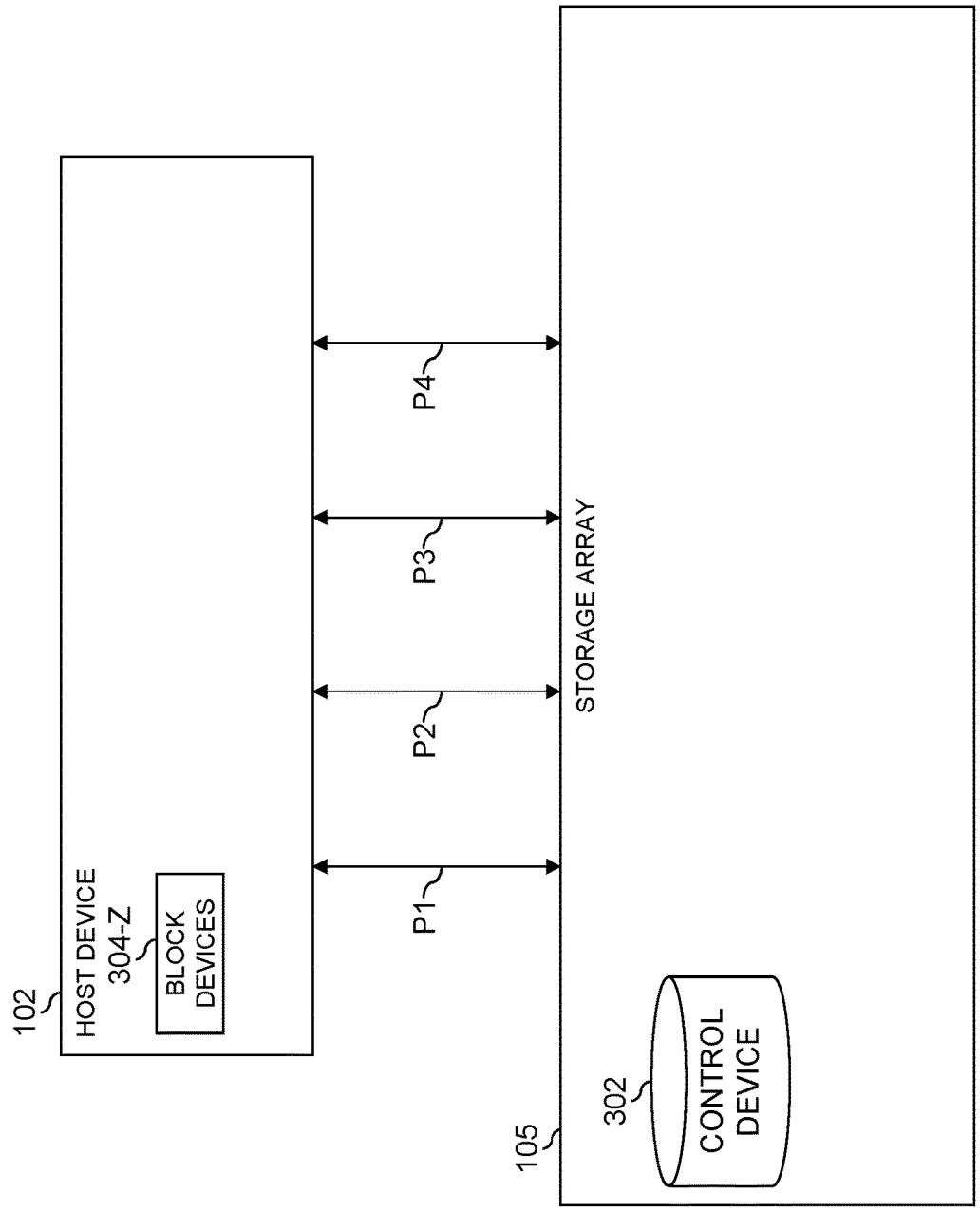
FIG. 3 is a block diagram illustrating an example control device provisioned on the storage array of FIG. 1 and corresponding example block devices configured on the host device of FIG. 1 in an illustrative embodiment.

With reference to FIG. 3, the storage array 105 may provision a control device 302, e.g., a virtual logical volume, for use by a host device 102 that has been zoned to the storage array 105. For example, the control device 302 may be automatically provisioned by the storage array 105 in conjunction with the zoning of the host device 102 to the storage array 105. The control device 302 provides a communication channel such as, e.g., a SCSI channel, along which the host device 102 may communicate with the storage array 105 to send information about the host device 102 to the storage array 105. In some embodiments, the control device 302 may not be configured for use by the host device 102 for storing application data. The storage array 105 may provision the control device at a pre-determined physical address on the storage devices 106 of the storage array 105, e.g., physical address 0 or any other address.

With continued reference to FIG. 3, once the control device 302 has been provisioned by the storage array 105 for use by the host device 102, the host device 102 configures block devices 304-Z that correspond to the control device 302, e.g., generates or otherwise creates the block devices 304-Z. For example, the block devices 304-Z comprise a block device for each path between the host device 102 and storage array 105. In the example of FIG. 3, the block devices 304-Z comprise a block device for path P1, a block device for path P2, a block device for path P3 and a block device for path P4. In an example scenario, the block devices 304-Z may comprise block devices /dev/sdf, /dev/sdg, /dev/sdh and /dev/sdi. While only four paths P are illustrated in the example of FIG. 3, any other number of paths P between the host device 102 and storage array 105 may be available for use by the host device 102 where the block devices 304-Z of the host device 102 that correspond to the control device 302 would comprise a block device that corresponds to each available path P.

The host device 102 is configured to utilize the block devices 304-Z to communicate with the storage array 105. As an example, one or more of the block devices 304-Z may be utilized by the host device 102 to submit message or commands to the storage array 105 via the control device 302. In an illustrative embodiment, the control device 302 is provisioned and the corresponding block devices 304-Z are configured as an initial communication functionality between the host device 102 and storage array 105 prior to the storage of application related data on the storage array 105 in one or more data logical volumes.

For example, the host device 102 may utilize the block devices 304-Z to submit a registration command to the storage array 105 that registers the paths P that correspond to the block devices 304-Z with the storage array 105 as corresponding to the host device 102.

The host device 102 is configured to submit inquiries to the storage array 105 along each path P using the corresponding block device. For example, the inquiries may be submitted periodically, on-demand in response to a user or application command, or in any other manner. The storage array 105 responds to the inquiry with information including, for example, a vendor identifier (VID) and a product identifier (PID). For example, with reference again to FIG. 3, the host device 102 may submit an inquiry using one of block devices 304-Z to the storage array 105, e.g., via the control device 302, and the storage array 105 may provide a response to the inquiry that comprises a VID/PID of VID1/CONTROL DEVICE. This response indicates to the host device 102 that the inquiry was received at the control device 302 provisioned by the storage array 105 for use by the host device 102.

Once the host device 102 is registered with the storage array 105 the host device 102 may request that the storage array 105 provision data logical volumes for use by the host device 102, e.g., by submitting a command via the block devices 304-Z. For example, an application executing on the host device 102, e.g., in a container, may request that the storage array 105 provision data logical volumes for use by the application.

Figure 4:
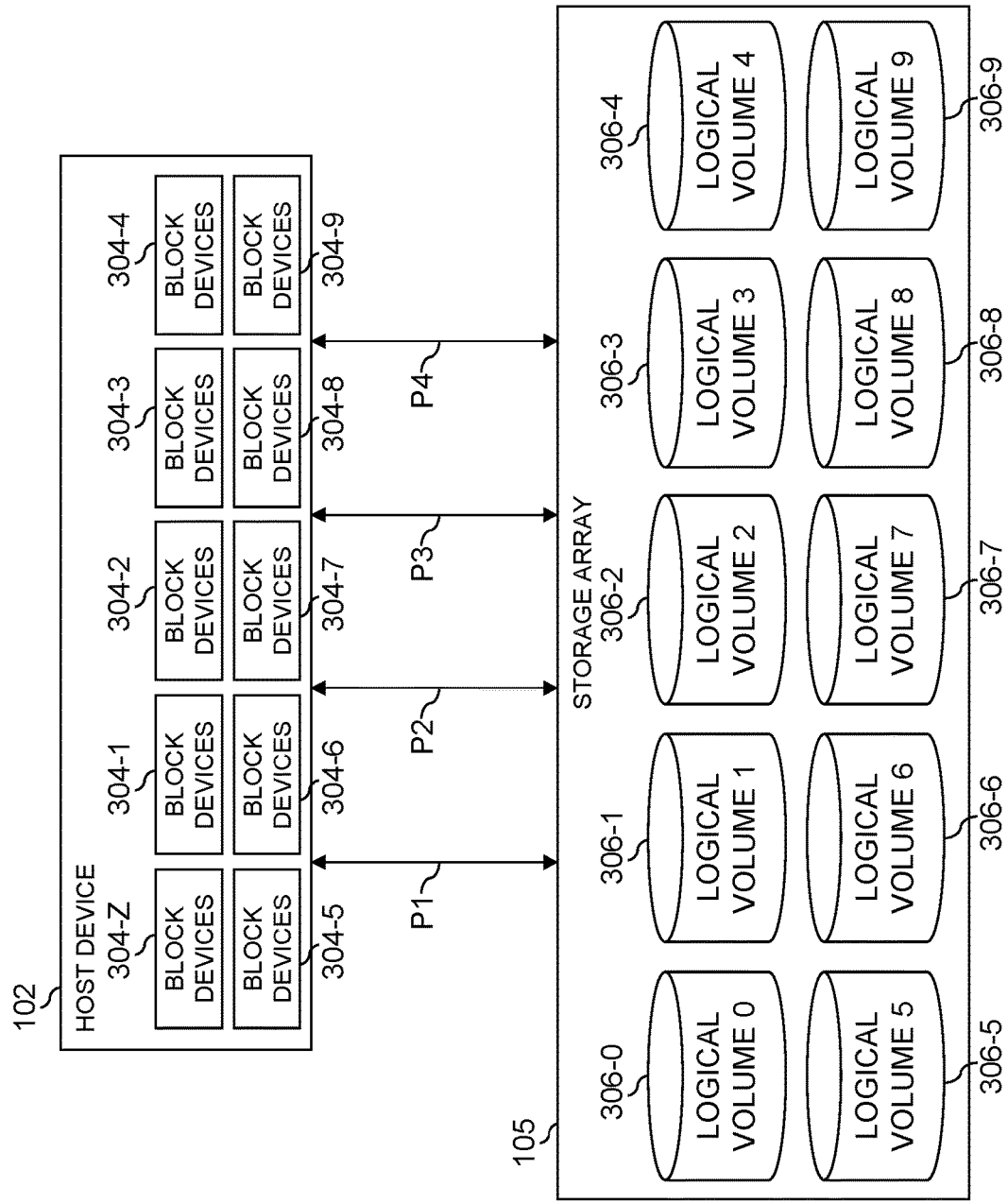
FIG. 4 is a block diagram illustrating the provisioning of example data logical volumes on the storage array of FIG. 3 and the configuration of corresponding example block devices on the host device of FIG. 3 in an illustrative embodiment.

In one example scenario, as shown in FIG. 4, the storage array 105 may provision ten data logical volumes 306-0, 306-1, 306-2, 306-3, 306-4, 306-5, 306-6, 306-7, 306-8 and 306-9 for use by the host device 102. Any other number of data logical volumes 306 may be provisioned. The provisioned data logical volumes 306 are not visible to the host device 102 until the host device 102 performs a bus scan. In an illustrative embodiment, the storage array 105 provisions the data logical volume 306-0 at the predetermined address, e.g., physical address 0 or another predetermined address, thereby replacing the control device 302. The storage array 105 replaces the control device 302, for example, because separate communication functionality is no longer needed between the host device 102 and the storage array 105. This is because any provisioned data logical volume may be utilized to receive the commands from the host device 102 that would have been submitted using the control device 302. The storage array 105 also provisions additional physical addresses for each of the remaining nine data logical volumes 306-1 through 306-9.

In the example scenario, when the host device 102 performs a bus scan to update its list of logical volumes, the host device 102 will see and add nine new data logical volumes with four paths each to its list of devices, e.g., data logical volumes 306-1 through 306-9, and configure thirty-six block devices, four block devices for each of data logical volumes 306-1 through 306-9. For example, as seen in FIG. 4, block devices 304-1, 304-2, 304-3, 304-4, 304-5, 304-6, 304-7, 304-8 and 304-9, each comprising one block device for each path P, are configured by the host device 102 for the respective corresponding provisioned data logical volumes 306-1, 306-2, 306-3, 306-4, 306-5, 306-6, 306-7, 306-8 and 306-9. Inquiries submitted by the host device 102 using block devices 304-1, 304-2, 304-3, 304-4, 304-5, 304-6, 304-7, 304-8 and 304-9 will return a response from the storage array 105 that comprises a VID/PID of VID1/PID1. As an example, VID1/PID1 may comprise DGC/RAIDS which indicates that the inquiry has communicated with data logical volumes.

Since the storage array 105 has replaced the control device 302 with data logical volume 306-0, however, host device 102 will not configured additional block devices for data logical volume 306-0. This is because the host device 102 has already configured block devices 304-Z for use in communicating with the control device 302 that was located at the predetermined address. For example, the bus scan will simply show the host device 102 that block devices 304-Z are still in use. Because of this, the host device 102 does not update its list of devices to reflect the presence of the provisioned data logical volume 306-0 and instead maintains an indication that control device 302 is still available for communication via the block devices 304-Z. In this case, the host device 102 continues to expect a response to an inquiry using block devices 304-Z to return a VID/PID of VID1/CONTROL DEVICE and not as VID1/PID1. However, now when an inquiry is sent to the storage array 105 utilizing any of block devices 304-Z, the response from the storage array 105 will comprise a VID/PID of VID/PID1 instead of VID1/CONTROL DEVICE. This is because while the host device 102 believes it is submitting the inquiry to the control device 302 via block devices 304-Z, it is actually submitting the inquiry to data logical volume 306-0 which replaced control device 302 in the storage array 105.

Because the list of devices does not include data logical volume 306-0, data logical volume 306-0 is not provided to any applications executing on the host device 102 as having been provisioned for storing application data. In some cases, the list of devices may be manually updated or refreshed to include the data logical volume 306-0 in the list of devices by a user of an application running on the host device 102 or by a user of the host device 102 itself. However, where a large number of host devices 102 or applications are present, manually updating each host device 102 may be both time consuming and unnecessarily labor intensive.

In illustrative embodiments, configuration logic 114 is configured to automatically handle a case where the provisioned data logical volume 306-0 has replaced the initial control device 302 that was utilized to register the host device 102 to the storage array 105.

Configuration logic 114 handles the configuration of the block devices 304 and the submission of inquiries along the block devices 304 to determine whether or not any paths associated with the block devices 304 are still alive and functioning. As mentioned above, an inquiry may be submitted utilizing the block devices 304 to determine a status of the corresponding paths. In response to the inquiry, the storage array 105 provides a VID/PID that corresponds to the provisioned data logical volume 306 or in some cases the provisioned control device 302, where no data logical volumes 306 have yet been provisioned for the host device 102.

As an example, after the host device 102 has registered the paths P with the storage array 105 by utilizing block devices 304-1 to submit commands to the control device 302, as shown in FIG. 3, the configuration logic 114 may periodically submit inquiries via the block devices 304-1 to confirm that the corresponding paths P are still alive. In the example scenario of FIG. 3, since no data logical volumes 306 (FIG. 4) have been provisioned yet, the inquiries reach the control device 302 on the storage array 105 and the storage array 105 provides a response comprising an indication of the VID/PID associated with the control device 302, e.g., VID1/CONTROL DEVICE. Configuration logic 114 may then store the indication found in the response to the inquiry in memory for later use, e.g., as a first indication.

After data logical volumes 306-0 through 306-9 have been provisioned by the storage array 105 for use by the host device 102 and a bus scan has been performed by the host device 102, for example, as described above, the host device 102 has configured block devices 304-Z and 304-1 through 304-9 for communicating with the storage array 105, as shown in the example of FIG. 4.

Configuration logic 114 continues submitting inquiries along the block devices 304 as described above. For example, configuration logic 114 may submit an inquiry using one of the block devices 304-1 which provides the inquiry for data logical volume 306-1 of the storage array 105 along the corresponding path P. In response to this inquiry, storage array 105 returns an indication of the VID/PID corresponding to the data logical volume 306-1, e.g., VID1/PID1.

Similarly, configuration logic 114 may submit an inquiry using one of the block devices 304-Z to the storage array 105. In this case, while the host device 102 expects that the inquiry is submitted for the control device 302 and the response will comprise an indication of the VID/PID of the control device 302, the storage array 105 returns an indication of the VID/PID of the data logical volume 306-0, e.g., VID1/PID1, instead of the expected VID1/CONTROL DEVICE associated with the control device 302. This is because the control device 302 was replaced by the data logical volume 306-0 when the data logical volume 306-0 was provisioned.

Configuration logic 114 is configured to compare an indication of a VID/PID that is received in response to a current inquiry to a prior indication stored in memory. For example, if the indication of the VID/PID stored in memory comprises VID1/CONTROL DEVICE and the response to the current inquiry comprises an indication of the VID/PID that also comprises VID1/CONTROL DEVICE, the configuration logic 114 may continue submitting the periodic inquiries using the block devices 304-Z.

On the other hand, if the indication of the VID/PID stored in memory comprises VID1/CONTROL DEVICE and the response to the current inquiry comprises an indication of the VID/PID that comprises VID1/PID1 or any other VID/PID, the configuration logic 114 is configured to take action to update the list of devices on the host device 102. In some embodiments, the response an inquiry may comprise a device identifier corresponding to the control device 302 or data logical volume 306. In such an embodiment, if the host device 102 determines that the device identifier provided in the response to the current inquiry is different than the device identifier of the control device 302, e.g., as provided in the response to the prior inquiry, the host device 102 may determine that a new data logical volume 306 has been assigned to the same location as the control device 302. In this case, the host device 102 may also take the action to update the list of devices on the host device 102.

For example, the configuration logic 114 may unconfigure the block devices 304-Z from control of the host device 102 or MPIO driver 112 so that they can no longer be utilized by the host device 102. In some embodiments, a command may be submitted by the configuration logic 114 to the kernel space of the host device 102 that is configured to delete or remove the block devices 304-Z. In some embodiments, all block devices 304 on the host device may be unconfigured, removed, deleted or any combination thereof by the configuration logic 114.

Figure 5:
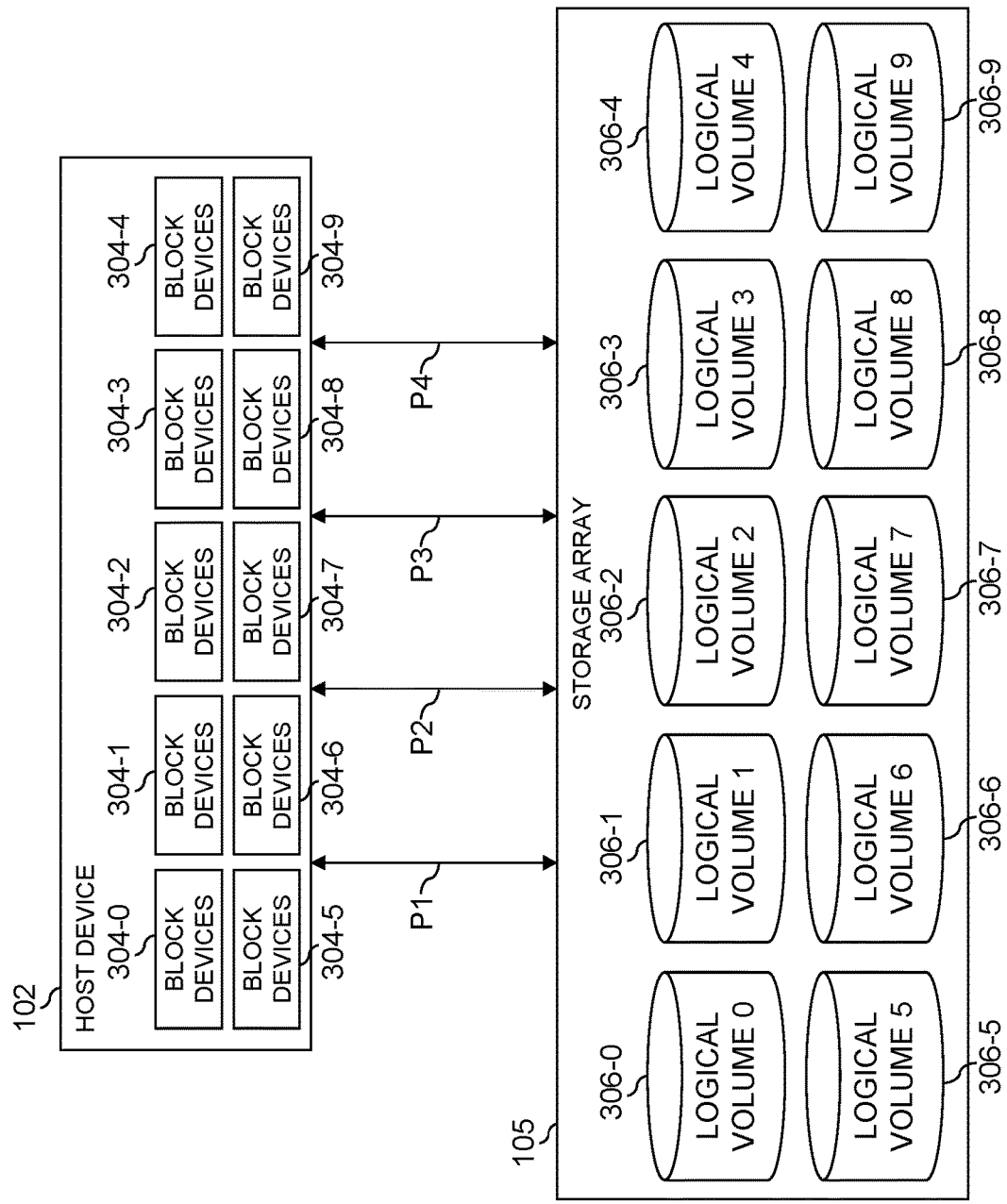
FIG. 5 is a block diagram illustrating a replacement of the example block devices of FIG. 3 that correspond to the example control device with example block devices that correspond to an example data logical volume of FIG. 4 that replaced the example control device of FIG. 3 in an illustrative embodiment.

Once the block devices 304-Z have been unconfigured and removed, the configuration logic 114 causes host device 102 to perform a bus scan. In this case, as seen in the example of FIG. 5, since the block devices 304-Z have been removed, host device 102 will now configure new block devices 304-0 for the data logical volume 306-0 that the storage array 105 provisioned as a replacement for the control device 302. In a case where all block devices 304 were removed by the configuration logic 114, block devices 304-1 through 304-9 may also be configured for the corresponding data logical volumes 306-1 through 306-9.

The block devices 304-0 through 304-9 may then be configured for use by the host device 102, MPIO driver 112 or applications running on the host device 102 to communicate with the storage array 105 for the submission of IO operations.

Illustrative embodiments of the techniques and functionality of configuration logic 114 will now be described in more detail with reference to the example process shown in the flow diagram of FIG. 6.

Figure 6:
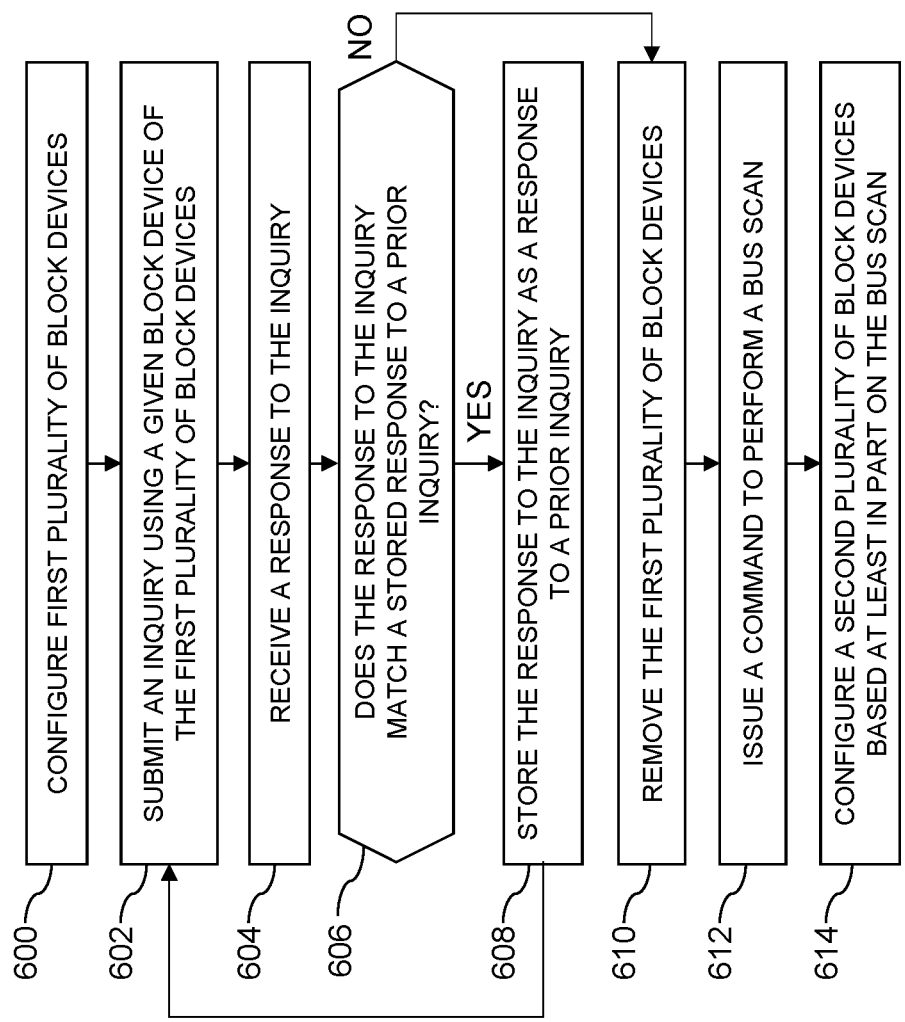
FIG. 6 is a flow diagram of an example process for the configuration of block devices in an illustrative embodiment.

The process as shown in FIG. 6 includes steps 600 through 614 and is suitable for use in the system 100 but is more generally applicable to other types of systems comprising multiple host devices and a shared storage system. The process will be described with reference also to FIGS. 1-5.

At step 600, configuration logic 114 configures a first plurality of block devices, e.g., block devices 304-Z in the example of FIGS. 3-5. For example, each block device of the first plurality of block devices corresponds to a path of the plurality of paths P between the host device 102 and a control device 302 or data logical volume 306 of the storage array 105. In the example of FIGS. 3-5, the control device 302 is provisioned by the storage system 105 for use by the host device 102 based at least in part on a zoning of the host device 102 to the storage array 105 as described above.

At step 602, configuration logic 114 submits an inquiry using a given block device of the first plurality of block devices.

At step 604, configuration logic 114 receives a response to the inquiry from the storage array 105. For example, the response may comprise a VID/PID associated with the control device 302 or data logical volume 306 that corresponds to the given block device, as described above.

At step 606, configuration logic 114 determines whether or not the response matches a stored response. For example, if a prior inquiry had returned a response comprising an indication that the VID/PID comprises VID1/CONTROL DEVICE, that response or indication is stored in memory of the host device 102. When a new inquiry is submitted to the storage array 105 using the block devices 304-Z, e.g., at step 602, the response may then be compared to the stored response, for example as described above. The comparison may be utilized to determine whether or not the storage array 105 has replaced the control device 302 with a data logical volume, e.g., data logical volume 306-0 as shown in FIG. 5.

If the configuration logic 114 determines that the stored response or indication matches the response or indication returned in the response received at step 604, or if this is the first response received by the host device 102 from the storage array 105, the configuration logic 114 is configured to store the response as a response to a prior inquiry at step 608. For example, in some embodiments, the latest stored response or indication may be replaced by the most recently received response or indication. The process then returns to step 602 and another inquiry may be submitted, for example, periodically, on-demand or in any other manner as described above.

Referring back to step 606, if the configuration logic 114 determines that the stored response or indication does not match the response or indication returned in the response received at step 604, e.g., the response comprises a VID/PID of VID1/PID1 instead of VID1/CONTROL DEVICE in the example of FIGS. 3-5, the process proceeds to step 610.

At step 610, configuration logic 114 removes the first plurality of block devices. In the example of FIGS. 3-5, block devices 304-Z may be unconfigured from the host device 102 or MPIO driver 112 and may be removed or deleted, e.g., by submitting a command to the kernel space of the host device 102 to remove or delete the block devices 304-Z.

At step 612, configuration logic 114 issues a command to the host device 102 to perform a bus scan to scan for changes to the storage array 105.

At step 614, configuration logic 114 configures a second plurality of block devices based at least in part on the bus scan. For example, in the example of FIG. 5, the configuration logic 114 configures block devices 304-0 for the paths to the corresponding data logical volume 306-0 instead of the removed block devices 304-Z.

Separate instances of the FIG. 6 process may be performed in respective additional host devices that share the storage array.

The particular processing operations and other system functionality described in conjunction with the flow diagram of FIG. 6 are presented by way of illustrative example only, and should not be construed as limiting the scope of the disclosure in any way. Alternative embodiments can use other types of processing operations involving host devices, storage systems and logics. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different configuration logic arrangements within a given information processing system.

Functionality such as that described in conjunction with the flow diagram of FIG. 6 can be implemented at least in part in the form of one or more software programs stored in memory and executed by a processor of a processing device such as a computer or server. As will be described herein, a memory or other storage device having executable program code of one or more software programs embodied therein is an example of what is more generally referred to herein as a "processor-readable storage medium."

The above-described functions associated with functionality for the configuration of block devices are carried out at least in part under the control of its configuration logic 114. For example, configuration logic 114 is illustratively configured to control performance of portions of the processes shown in the flow diagram described above in conjunction with FIG. 3.

It is assumed that each of the other MPIO drivers 112 are configured in a manner similar to that described above and elsewhere herein for the first MPIO driver 112-1. The other host devices 102 of the system 100 are therefore also configured to communicate over the SAN 104 with the storage array 105, and the MPIO drivers 112 of such other host devices 102 are each similarly configured to select IO operations from a corresponding one of the sets of IO queues 110 for delivery to the storage array 105 over the SAN 104. Accordingly, functionality described above in the context of the first MPIO driver 112-1 is assumed to be similarly performed by each of the other MPIO drivers 112-2 through 112-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support functionality for the configuration of block devices.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with non-volatile memory express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeOF.

As indicated previously, absent use of functionality for the configuration of block devices as disclosed herein, the host device 102 will not be aware of or be able to access and store data on the provisioned data logical volume 306-0 that replaced the control device 302 since it still utilizes the same block devices 304-Z. This leads to inefficiencies in the storage system as well as in the storage array.

Such drawbacks are advantageously overcome in illustrative embodiments herein by utilization of configuration logic 114 to implement functionality for the configuration of block devices as described above. For example, the disclosed techniques allow the host device 102 to automatically unconfigure and remove or delete the block devices 304-Z that correspond to the control device 302 when the host device 102 determines that the control device 302 has been replaced by a provisioned data logical volume 306-0 through the use of the inquiry functionality. The configuration logic 114 takes advantage of the inquiry responses to identify the mismatch between the prior and current responses to identify when the control device 302 has been replaced by a data logical volume 306-0. The configuration logic 114 then is able to unconfigure and remove or delete the prior block devices 304-Z and replace them with new block devices vis the bus scan functionality to ensure that block devices 304-0 that are properly associated with the data logical volume 306-0 are being used to submit commands and other communications to the storage array 105 that are associated with the data logical volume 306-0.

It is to be appreciated that these and other features of illustrative embodiments are presented by way of example only and should not be construed as limiting in any way. Accordingly, different numbers, types and arrangements of system components such as host devices 102, SAN 104, storage array 105, storage devices 106, sets of IO queues 110, MPIO drivers 112, configuration logic 114, controllers 124 and cache 126 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise RAM, ROM, flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the configuration logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers and additional or alternative components. Also, the particular configurations of system and device elements and associated processing operations illustratively shown in the drawings can be varied in other embodiments. For example, a wide variety of different MPIO driver configurations and storage array arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a host device comprising a processor coupled to memory, the host device being configured to communicate over a network with a storage system via a plurality of paths, the host device being configured:
   to configure a first plurality of block devices, each block device of the first plurality of block devices corresponding to a path of the plurality of paths between the host device and a control device of the storage system, the control device having been provisioned by the storage system for use by the host device based at least in part on a zoning of the host device to the storage system;
   to submit, to the storage system, an inquiry using a given block device of the first plurality of block devices;
   to receive, from the storage system, in response to the inquiry, an indication that the given block device corresponds to a data logical volume that has been provisioned by the storage system for use by the host device;
   to issue a command to remove the first plurality of block devices based at least in part on receiving the indication that the given block device corresponds to the data logical volume;
   to perform a scan of the plurality of paths; and
   to configure, based at least in part on the scan, a second plurality of block devices, each block device of the second plurality of block devices corresponding to a path of the plurality of paths between the host device and the data logical volume.

2. The apparatus of claim 1 wherein:
the indication comprises a first indication;
the inquiry comprises a first inquiry;
the host device is further configured:
   to submit, to the storage system, a second inquiry using the given block device of the first plurality of block devices; and
   to receive, from the storage system, in response to the second inquiry, a second indication that the given block device corresponds to the control device; and
   to store the second indication in memory based at least in part on receiving the second indication in response to the second inquiry.

3. The apparatus of claim 2 wherein:
the host device is further configured to determine that the first indication is different than the second indication; and
issuing the command to remove the first plurality of block devices comprises to issuing the command to remove the first plurality of block devices based at least in part on the determination that the first indication is different than the second indication.

4. The apparatus of claim 2 wherein:
the data logical volume comprises a first data logical volume; and
the host device is further configured:
   to submit, to the storage system, a request to provision a plurality of data logical volumes for the host device, the plurality of data logical volumes comprising the first data logical volume and at least a second data logical volume, the storage system being configured to replace the control device with the first data logical volume; and
   to configure a third plurality of block devices, each block device of the third plurality of block devices corresponding to a path of the plurality of paths between the host device and the second data volume of the storage system.

5. The apparatus of claim 4 wherein the host device is configured to submit the request to provision the plurality of data logical volumes for the host device using at least one of the first plurality of block devices.

6. The apparatus of claim 4 wherein the host device is configured to submit the request to provision the plurality of data logical volumes after the host device has stored the second indication in memory.

7. The apparatus of claim 1 wherein the host device is further configured to submit, to the storage system, a registration command using the given block device of the first plurality of block devices, the registration command being configured to indicate to the storage system that path of the plurality of paths that corresponds to the given block device is associated with the host device.

8. A method comprising:
configuring a first plurality of block devices, each block device of the first plurality of block devices corresponding to a path of a plurality of paths between a host device and a control device of a storage system, the host device being configured to communicate over a network with the storage system via the plurality of paths, the control device having been provisioned by the storage system for use by the host device based at least in part on a zoning of the host device to the storage system;

submitting, to the storage system, an inquiry using a given block device of the first plurality of block devices;

receiving, from the storage system, in response to the inquiry, an indication that the given block device corresponds to a data logical volume that has been provisioned by the storage system for use by the host device;

issuing a command to remove the first plurality of block devices based at least in part on receiving the indication that the given block device corresponds to the data logical volume;

performing a scan of the plurality of paths; and configuring, based at least in part on the scan, a second plurality of block devices, each block device of the second plurality of block devices corresponding to a path of the plurality of paths between the host device and the data logical volume;

wherein the method is performed by at least one processor of the host device.

9. The method of claim 8 wherein:

the indication comprises a first indication;

the inquiry comprises a first inquiry;

the method further comprises:

submitting, to the storage system, a second inquiry using the given block device of the first plurality of block devices; and receiving, from the storage system, in response to the second inquiry, a second indication that the given block device corresponds to the control device; and storing the second indication in memory based at least in part on receiving the second indication in response to the second inquiry.

10. The method of claim 9 wherein:

the method further comprises determining that the first indication is different than the second indication; and issuing the command to remove the first plurality of block devices comprises to issuing the command to remove the first plurality of block devices based at least in part on the determination that the first indication is different than the second indication.

11. The method of claim 9 wherein:

the data logical volume comprises a first data logical volume; and the method further comprises:

submitting, to the storage system, a request to provision a plurality of data logical volumes for the host device, the plurality of data logical volumes comprising the first data logical volume and at least a second data logical volume, the storage system being configured to replace the control device with the first data logical volume; and configuring a third plurality of block devices, each block device of the third plurality of block devices corresponding to a path of the plurality of paths between the host device and the second data volume of the storage system.

12. The method of claim 11 wherein the request to provision the plurality of data logical volumes for the host device is submitted using at least one of the first plurality of block devices.

13. The method of claim 11 wherein the request to provision the plurality of data logical volumes is submitted after the host device has stored the second indication in memory.

14. The method of claim 8 wherein the method further comprises submitting a registration command to the storage system using the given block device of the first plurality of block devices, the registration command being configured to indicate to the storage system that path of the plurality of paths that corresponds to the given block device is associated with the host device.

15. A computer program product comprising a non-transitory processor-readable storage medium having stored therein program code of one or more software programs, wherein the program code, when executed by at least one processor of a host device, causes the host device:

to configure a first plurality of block devices, each block device of the first plurality of block devices corresponding to a path of a plurality of paths between the host device and a control device of a storage system, the host device being configured to communicate over a network with the storage system via the plurality of paths, the control device having been provisioned by the storage system for use by the host device based at least in part on a zoning of the host device to the storage system;

to submit, to the storage system, an inquiry using a given block device of the first plurality of block devices;

to receive, from the storage system, in response to the inquiry, an indication that the given block device corresponds to a data logical volume that has been provisioned by the storage system for use by the host device;

to issue a command to remove the first plurality of block devices based at least in part on receiving the indication that the given block device corresponds to the data logical volume;

to perform a scan of the plurality of paths; and to configure, based at least in part on the scan, a second plurality of block devices, each block device of the second plurality of block devices corresponding to a path of the plurality of paths between the host device and the data logical volume.

16. The computer program product of claim 15 wherein:

the indication comprises a first indication;

the inquiry comprises a first inquiry;

the program code further causes the host device:

to submit, to the storage system, a second inquiry using the given block device of the first plurality of block devices; and to receive, from the storage system, in response to the second inquiry, a second indication that the given block device corresponds to the control device; and to store the second indication in memory based at least in part on receiving the second indication in response to the second inquiry.

17. The computer program product of claim 16 wherein:

the program code further causes the host device to determine that the first indication is different than the second indication; and issuing the command to remove the first plurality of block devices comprises to issuing the command to remove the first plurality of block devices based at least in part on the determination that the first indication is different than the second indication.

18. The computer program product of claim 15 wherein:

the data logical volume comprises a first data logical volume; and the program code further causes the host device:

to submit, to the storage system, a request to provision a plurality of data logical volumes for the host device, the plurality of data logical volumes comprising the first data logical volume and at least a second data logical volume, the storage system being configured to replace the control device with the first data logical volume; and to configure a third plurality of block devices, each block device of the third plurality of block devices corresponding to a path of the plurality of paths between the host device and the second data volume of the storage system.

19. The computer program product of claim 18 wherein the program code further causes the host device to at least one of:
submit the request to provision the plurality of data logical volumes for the host device using at least one of the first plurality of block devices; and
submit the request to provision the plurality of data logical volumes after the host device has stored the second indication in memory.

20. The computer program product of claim 15 wherein the program code further causes the host device to submit, to the storage system, a registration command using the given block device of the first plurality of block devices, the registration command being configured to indicate to the storage system that path of the plurality of paths that corresponds to the given block device is associated with the host device.

* * * * *